UNITED STATES PATENT OFFICE.

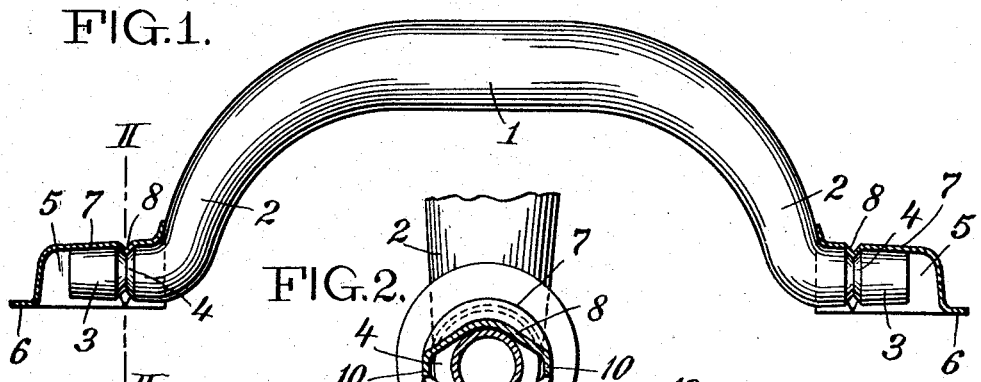

BENJAMIN MARKOWITZ, OF ROCKVILLE CENTER, NEW YORK.

PIVOTED HANDLE FOR SUITCASES.

1,223,503.  Specification of Letters Patent.  Patented Apr. 24, 1917.

Application filed June 2, 1916. Serial No. 101,408.

*To all whom it may concern:*

Be it known that I, BENJAMIN MARKOWITZ, a citizen of the United States, and a resident of Rockville Center, Long Island, in the county of Nassau and State of New York, have invented a certain new and useful Pivoted Handle for Suitcases, of which the following is a specification.

This invention relates to a handle adapted for attachment to a suit case or other receptacle.

The object is to provide a handle that in itself contains a means for attachment, and a means for pivoting the handle.

The invention consists of a U-shaped handle having its two ends shaped approximately of cylindrical form and arranged so that their longitudinal axes are in line with each other; and devices adapted for attachment to a receptacle which devices are rotatably mounted on the cylindrical ends in such a manner that the attaching devices are retained thereon.

In the accompanying drawing:

Figure 1 is a side view of the handle, the pivoted attaching devices being shown in section.

Fig. 2 is a transverse section on the line II—II of Fig. 1.

Fig. 3 is a side view of a handle and an attaching device showing the means for retaining the attaching device on the handle.

Fig. 4 is a view of the under side of parts shown in Fig. 3.

Fig. 5 is a side view of the attaching device previous to mounting it on the handle.

Fig. 6 is a transverse section on the line VI—VI of Fig. 5.

Figs. 7 and 8 show modifications of the means for retaining the attaching device on the handle.

The handle is made hollow of sheet metal and is to have the usual central part 1 having downwardly curved ends 2. The two extremities of curved ends 2 are bent outward so that their longitudinal axes are in line with each other. These outwardly extending ends are shaped to have a conical or approximately cylindrical form. Each cylindrical end 3 is provided with an annular groove 4. Each end 3 is placed in a recess 5 formed in a sheet metal plate 6, a wall 7 of said recess being shaped to correspond with the cylindrical surface of the said end, and having an inwardly extending rib 8 adapted to engage the annular groove 4. After placing the end 3 in the recess 5, portions 9 of walls 10 of the recess are forced inward below the ends 3 a distance sufficient to hold the ends in place within the recess, as shown in Figs. 2, 3 and 4. The portions 9 are formed by cutting slits 11 on two sides thereof in the two side walls 10. The rib 8 is formed by crimping a portion of the wall 7, as shown in Figs. 1, 2 and 3.

Each plate 6 is provided with perforations 12 through which rivets or screws may be passed for the purpose of attaching the plates with the handle 1 pivoted thereto to any desired receptacle. It will be evident that cord, wire, or a strap, to be passed around a bundle could also be passed through the perforations 12, thereby providing an adjustable handle. By reference to Figs. 1, 2, 3 and 4, it will be seen that the handle is free to swing in the recesses 5 of the plate 6, and that any tendency of the ends 3 to move longitudinally in the recesses, owing to possible buckling of parts 1 and 2, will be prevented by the rib 8 and portions 9 in engagement with the annular groove 4 of the ends 3.

In the modification shown in Fig. 7, each of the ends 3 is held in the recess 5 by means of a rivet 13 passing through perforation 14 formed in the side walls 10. The rivet 13 also engages the annular groove 4 thereby serving together with the rib 8 to prevent longitudinal movement of the end 3.

In the modification shown in Fig. 8, the rib 8 for preventing longitudinal movement of end 3 is omitted, and two crimped portions 15 of the side walls 10, by engagement with the annular groove 4 and the under side of end 3, serve the two-fold purpose of holding the end 3 up, and preventing longitudinal movement thereof in the recess 5. In order to insert the end 3 in the portion of recess 5 above the crimped portions 15, the bottom of annular groove 4 is forced against inclines 16 forming part of the lower ends of crimped portions 15, and, owing to the elasticity of plate 6, the portions 15 move outward, thereby permitting the end 3 to be moved to the upper part of recess 5. Portions 15 will then return to their normal position below the end 3, and thereby serve to hold the end 3 in place.

Having described my invention, what I claim is:

1. An attachable handle, comprising a

U-shaped member having its two ends shaped round in cross section and bent outward so that their longitudinal axes are in line with each other, each of said outwardly bent ends being provided with an annular groove; attaching members provided with U-shaped recesses in which said outwardly bent ends may be placed; the two side walls of said U-shaped recesses being provided with struck-out resilient tongues 9 which may be forced into said annular recesses of said outwardly bent ends, whereby movement of said attaching members transversely to or in line with the longitudinal axes of said ends is prevented, while permitting said ends to rotate in said recesses of said attaching members.

2. An attachable handle, comprising a U-shaped member having its two ends shaped round in cross section and bent outward so that their longitudinal axes are in line with each other, each of said outwardly bent ends being provided with an annular groove; attaching members provided with U-shaped recesses in which said outwardly bent ends may be placed; the two side walls of said U-shaped recesses being provided with struck-out resilient tongues 9 which may be forced into said annular recesses of said outwardly bent ends, whereby movement of said attaching members transversely to or in line with the longitudinal axes of said ends is prevented, while permitting said ends to rotate in said recesses of said attaching members; in combination with means whereby said members having said U-shaped recess may be attached to any desired article.

Signed at New York city, in the county of New York and State of New York, this 31st day of May, A. D. 1916.

BENJAMIN MARKOWITZ.

Copies of this patent may be obtained for five cents each, by addressing the "Commissioner of Patents, Washington, D. C."